Inventors
Ernst Nanz
Hans-Gerhard Hagenah
Walter Kröpfle
By: Fisher, Christen, Sabol & Caldwell Inventors
Ernst Nanz
Hans-Gerhard Hagenah
Walter Knöpfle
By: Fisher, Christen, Sabol & Caldwell Inventors
Ernst Nanz
Hans-Gerhard Hagenah
Walter Knöpfle
By: Fisher, Christen, Sabol & Caldwell Inventors
Ernst Nanz
Hans-Gerhard Hagenah
Walter Knöpfle
By: Fischer, Christen, Sabol + Caldwell Inventors
Ernst Nanz
Hans-Gerhard Hagenah
Walter Knöpfle
By Fisher, Christen, Sabol & Caldwell Inventors
Ernst Nanz
Hans-Gerhard Hagenah
Walter Knöpfle
By Fisher, Christen, Sabol & Caldwell Inventors
Ernst Nanz
Hans-Gerhard Hagenah
Walter Knöpfle
By: Fisher, Christen, Sabol + Caldwell Inventors
Ernst Nanz
Hans-Gerhard Hagenah
Walter Knöpfle
By: Fisher, Christen, Sabol & Caldwell

United States Patent Office 3,425,703
Patented Feb. 4, 1969

3,425,703

AUTOMATIC PHONOGRAPH TURNTABLE

Ernst Nanz, 9 Martin-Luther-Str., Hans-Gerhard Hagenah, 20 Hansjakobweg, and Walter Knöpfle, 5 Martin-Luther-Str., all of St. Georgen, Black Forest, Germany Filed Oct. 28, 1965, Ser. No. 505,572
Claims priority, application Germany, Oct. 29, 1964, 35,390; June 10, 1965, 37,010
U.S. Cl. 274—15 8 Claims
Int. Cl. G11b *17/06*

ABSTRACT OF THE DISCLOSURE

Mechanism for selecting the starting position for the tone arm of an automatic record player in accordance with the diameter of the record on the turntable wherein a series of stops are provided to limit the inward pivoting movement of the arm, the appropriate stop being selected by depressable pins on the turntable actuated by the placing of a record thereon.

The invention relates to a record scanning device analyzing the size of the record and pivoting the tone arm over the starting groove of the record by means of a control mechanism.

In phonographs, particularly those having an automatic record changing mechanism, the placing of the tone arm upon the record must be done at differing positions above the turntable, in dependence upon the respective record diameter, in such a manner that when the tone arm is lowered its scanning stylus enters the starting groove of the record. For this purpose, in known devices scanning apparatus are provided for determining the size of the record which commence operation either during the period the record is still on the stored stack of records, or shortly before the record falls upon the turntable. For this purpose, laterally provided probing levers are known for scanning the rim of the record which are actuated, for example, during the falling of the record. Furthermore, probing levers have already been proposed which operate in conjunction with the movement of the tone arm.

Conventionally, in the scanning operation differentiation must be made among at least three standardized record sizes. In most instances, for correctly controlling the engaging motion of the tone arm for records having a diameter of 30 cm. and 25 cm., respectively, a probing lever is pivoted into different positions, while the tone arm automatically adjusts to the third record size of 17 cm. diameter if the probing lever is not touched in this case.

In a similar manner, for automatically placing the tone arm when playing individual records, without using an automatic record changer, it is necessary to scan the diameter of the record, this being done at the time the record has already been placed upon the rotating turntable. In this connection, it is known to have probes, which can be combined with the above-mentioned probing levers responding when the record falls down, scan the rotating record at the rim. Further, constructions have already been suggested wherein one or several manually actuated scanning probes are provided on the undercarriage or the plate of the phonograph, these probes scanning from below the record lying on the turntable along the rim projecting beyond the turntable.

These constructions for the automatic placing of the tone arm are burdened by the disadvantage that, because of the scanning of the rotating record, there is a relative movement between the record and the probe element, this leading, in certain instances, to an unintended wear and tear of the record and to an impairment of the reproduction quality. The above-mentioned scanning of the record along the record rim projecting beyond the turntable furthermore disadvantageously limits the usable turntable diameter since this diameter must be kept small for scanning records of smaller diameter. However, this fact contradicts the requirement in connection with the construction of high-quality phonographs to employ a turntable which is as large and heavy as possible.

It has furthermore been proposed to switch a change-speed friction gear (variable friction gear) of a turnable in dependence upon the speed of rotation assigned to a record placed upon the turntable; for this purpose, a ring is provided on the turntable concentric to the axis of the latter, which ring can be compressed by the record. Depending upon whether or not the record has a large or small diameter, this ring is compressed when the records are placed on the turntable and switches the change-speed friction gear over. However, such arrangements can function securely only in case a certain speed of rotation is always assigned to a particular diameter of record, but this is not the case in numerous commerically available records so that it is not positively possible to set the corresponding speed on the basis of the size of the record. Therefore, it would be desirable, when scanning a magnitude essential for playing the record, to probe such a magnitude directly, if possible, and not indirectly by way of a further parameter having no unequivocal connection with the magnitude to be determined as is the case, for example, in the conventional arrangement with respect to the central hole of the record and the speed of rotation of the record.

The invention starts with the task to obviate the above-mentioned disadvantages of conventional phonographs having a record scanning device, and is intended to propose a device wherein particularly between the rotating record and the scanning device no relative motion occurs.

This problem is solved in accordance with the invention by a record scanning (probing) device characterized by at least one probe element for scanning the size of the record, this probe element being provided on the turntable rotating with the latter and actuated by the record placed upon the turntable. This probe element triggers the control mechanism for pivoting the tone arm over the starting groove of the record.

In a preferred embodiment of the invention, at least one pin is provided as the probe element, being under spring tension and compressible by the weight of the record placed thereon to assume various vertical positions.

In another preferred embodiment of the invention, the probe element can be moved toward the record from an external position for the purpose of scanning the record.

In a further preferred embodiment of the invention, records of varying sizes rest on profiled webs (fillets) of the turntable in positions with respect to the vertical which differ in each particular case, and the respective vertical position is scannable by one or several probe elements.

The probe elements are suitably fashioned in such a manner that they set a probing lever in certain angular positions via deflection paths (tracks), this probing lever limiting the pivoting motion of the tone arm with the aid of abutment surfaces. In this connection, the provision is preferably made that, when the tone arm is pivoted, a probing lever connected with the tone arm by way of a disengageable friction (friction gear) meets the abutment surfaces. Furthermore, it is advantageous to provide a control member for pivoting the probing lever into and/or out of the range of the probe elements rotating with the turntable.

The invention further relates to an advantageous further development of a probe element actuated by the record placed upon the turntable with the objective to construct this probe element in such a manner that, when the turntable is empty, the tone arm is prevented from pivoting into the playing position.

This is accomplished according to the invention by having the probe element assume a rest position when there is no weight load by a record (when the turntable is not weighted by a record) wherein it blocks the inward pivoting of the tone arm.

Thereby, the advantage is obtained that, when the phonograph is actuated without a record having been placed on the turntable, the tone arm cannot be lowered in the region of the rotating turntable and thus the turntable cannot damage the sensitive scanning system of the tone arm. The provision can be made, for example, that in case of such a no-load start, the tone arm is lifted, but hovers above its support and finally comes to rest again upon its support.

In accordance with a preferred embodiment of the invention, the probe element fashioned as a compressible pin is separated from the guide tracks of a control lever when in its rest position.

In a further preferred embodiment of the invention, the control lever is provided with a stop which blocks, in the rest position of the probe element, the pivoting movement of the tone arm by contacting an opposed (abutment) surface.

The following description of preferred embodiments of the invention serves for an additional explanation of the invention in conjunction with the appended drawing.

Figure 1:
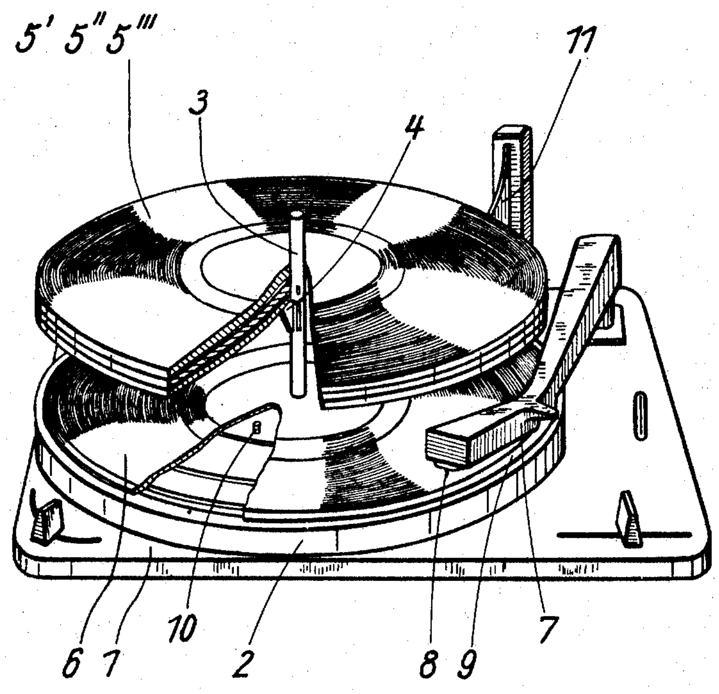
FIG. 1 shows a perspective view of a phonograph having an automatic record changer, in accordance with the teachings of this invention.

From FIG. 1, the main elements of a phonograph having an automatic record changer can be seen. On a support plate 1, a turntable 2 is rotatably mounted; the turntable can be set into rotation by a motor which is not shown. In the center of the turn table 2, a free-standing dropping spindle 3 is provided on whose support members 4 several records 5', 5'', 5''' . . . are stored. Upon changing a record, the support members 4 are pivoted inwardly so that the, respectively, lowermost record can fall upon the turntable 2.

In the illustrated phonograph, a record 6 lies upon the turntable 2, a tone arm 7 being pivoted above this record in such a manner that the scanning stylus 8 of the tone arm is positioned above the starting groove 9 of the record 6. On the support plate 1, a probing lever 11 is provided in a stationary manner, this probing lever scanning the size of the records in storage, for example, when they fall down and effecting, via a control mechanism (not shown) the pivoting of the tone arm 7 into the correct operating position.

As has been mentioned above, a stationary scanning element is to be replaced, according to the invention, by a probe element rotating with the turntable 2. Such a probe element is illustrated at 10 in the form of a probing pin compressible by the weight of the record lying on the turntable. The probing pin 10, of which several can also be provided, is arranged at a distance from the center of the turntable adjusted to the size of the record, for example, in such a manner that it is depressed downwardly by a record of a diameter of 30 cm., while it is not contacted by a record having a diameter of 25 cm. The probing pin is connected, in a manner which will be explained below, with a control mechanism pivoting the tone arm in dependence upon the record size scanned by the probing pin in such a manner that it can enter into the starting groove of the record.

In the illustrated embodiment, the probing pin or pins 10 scan in each case the size of the lowermost record lying on the turntable. For all further records being placed on the turntable, the tone arm drops to the same diameter as corresponds to the record in the lowermost position. In order to make it possible to play records having varying diameters in the correct manner also when employing record changers, the probing pins rotating with the turn table can in such a case, according to the invention, be combined with stationary scanning feelers, for example, in the form of the probing lever 11.

In the embodiment illustrated in FIG. 1, the probing pin is actuated by the weight of the record lying on the turntable. However, it is also possible normally to keep the probe element of the invention retracted within the turntable and have it contact the record merely for the purpose of probing the same.

Figure 2:
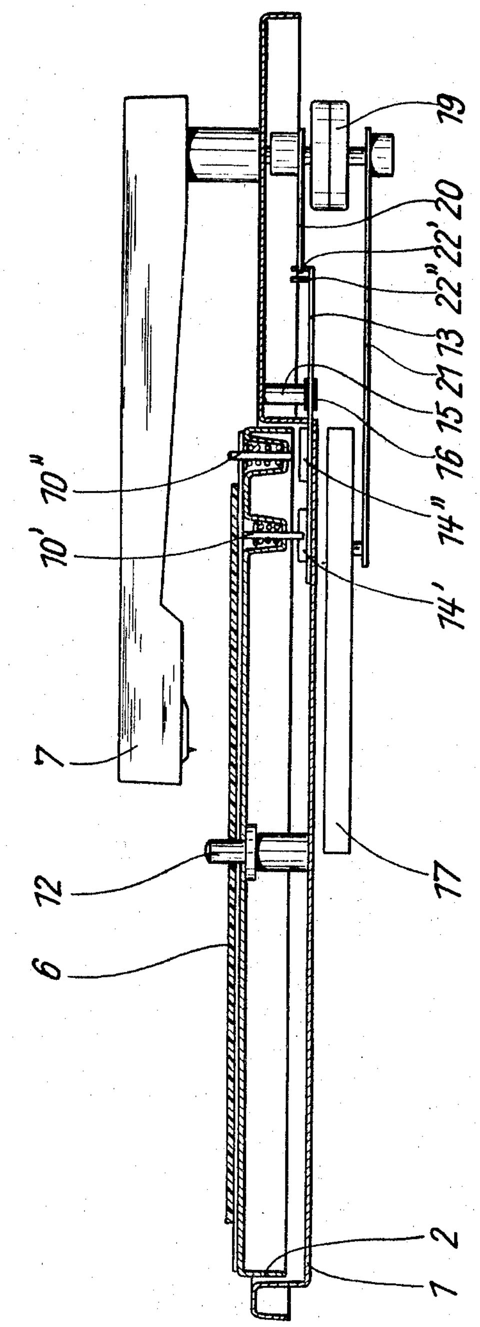
FIG. 2 shows a sectional elevation of a phonograph shown in FIG. 1.

FIG. 2 shows a section through a phonograph wherein the dropping spindle 3 of FIG. 1 is replaced by a short pin 12. Since, in this case, the device serves for playing single records, the probing lever 11 is omitted. The record 6 again is positioned on the turntable 2 rotatably mounted on the support plate 1. The weight of the record 6 presses a probing pin 10' downwardly against the force of a spring so that the probing pin is placed in the range of a probing lever 13. Upon rotation of the turntable 2, the compressed pin 10' meets a deflection surface (track) 14' provided on the probing lever 13 rotatably mounted at 15. Thereby, the probing lever 13 is pivoted by the depressed probing pin 10' by a certain angle corresponding to the size of the record 6 lying upon the turntable 2. In this angular position, the probing lever 13 is detained by a friction plate 16 mounted on the pivotal axis 15 of the lever during the pivoting of the tone arm into the engagement position. After the tone arm is engaged with the record, the probing lever can be restored to its rest position via a conventionally operated control mechanism 17 which is not explained in detail and forms no part of this invention. The control mechanism 17 may also serve for pivoting the probing lever in such a manner that the lever enters the effective range of the probing pin 10.'

Figure 3:
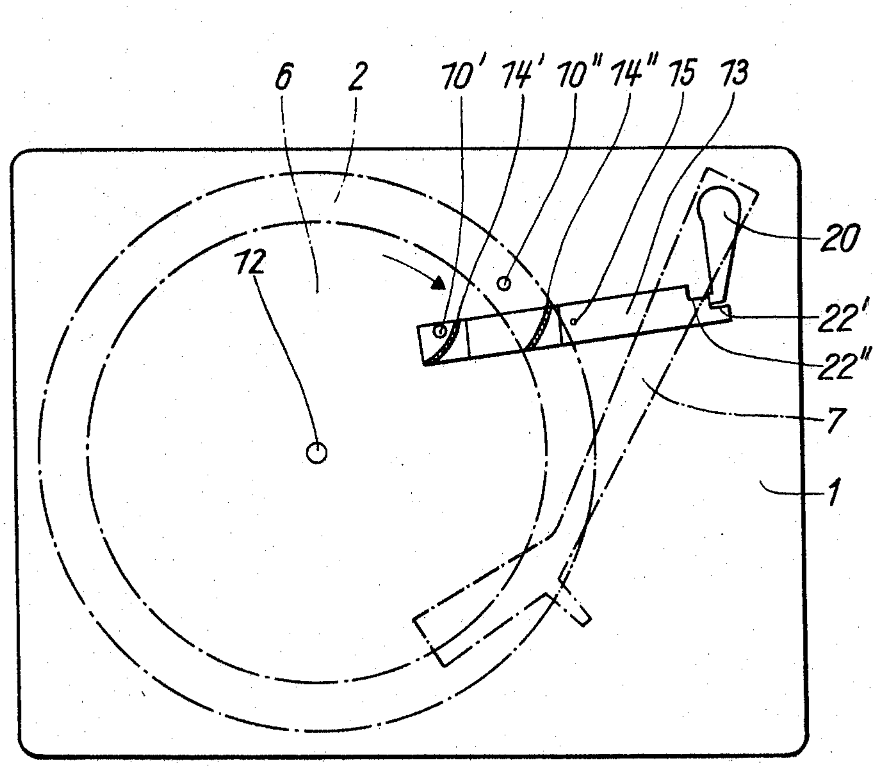
FIG. 3 shows a plan view of the phonograph of FIGS. 1 and 2.

Upon the commencement of a cycle of the record changer, or an engagement process of the tone arm, when playing individual records, the probing lever 13, as mentioned above, is placed in the range of the probing pin 10'. As can be seen from FIG. 2, two probing pins 10' and 10'' are provided which are arranged at respectively differing spacings from the pin 12 in the center of the turntable. Depending upon the size of the record, one or both probing pins 10, 10'' are pressed downwardly so that they enter the effective range of the deflection paths 14', 14'' assigned thereto. At the right hand end of the probing lever 13, as seen in FIG. 3, there are several abutment surfaces 22', 22'', provided in correspondence with the various record sizes. Furthermore, a sensing lever 20 (see also FIG. 3) is coupled with the shaft 18 of the tone arm 7. When pivoting the tone arm 7 in the lifted position, which is done starting with the control mechanism 17 via conventional control members 21 and a conventional friction gear, the movement of the tone arm 7 beyond a certain pivot angle depending upon the size of the record is prevented by the sensing lever 20 contacting one of the abutment surfaces 22′, 22″ . . . . The torsional forces of the control mechanism 17 are absorbed by the friction clutch 19. For playing the record 6, the tone arm is lowered via the control members 21 in a conventional manner. During this operation, the coupling effected by the friction clutch 19 disengages so that the tone arm 7 can play the record without obstruction. In correspondence with the varying record diameters, it is possible to provide, in addition to the above-mentioned probing pins 10′, 10″, still further pins and corresponding deflection paths, as well as abutment surfaces.

Figure 4:
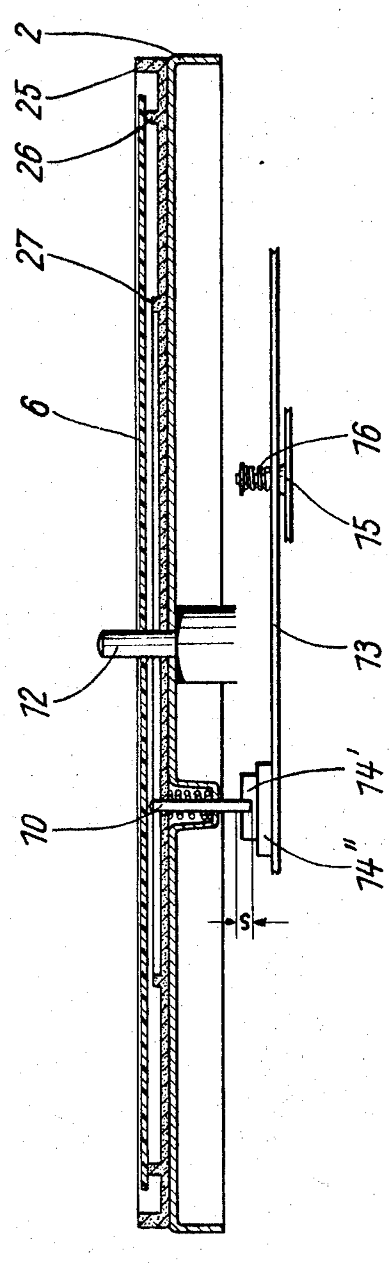
FIG. 4 shows a sectional elevation of another embodiment of a phonograph according to the invention.
Figure 5:
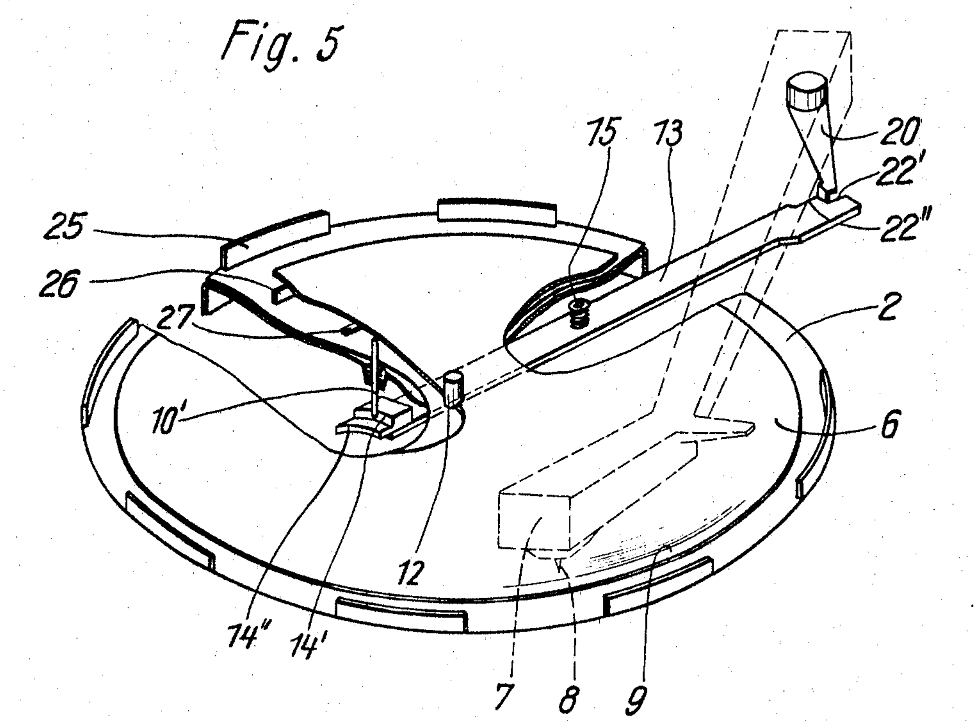
FIG. 5 shows a perspective view of the phonograph of FIG. 4, with portions broken away.

FIGS. 4 and 5 show a turntable 2 wherein, by the use of a profiled surface, records are positioned on variously high webs or segments, in dependence upon the different diameters of the records. The turntable 2, rotatable about the pin 12, has, on account of the profiled covering, elevated webs 25 having the shape of a circular arc for placing thereupon a record of a diameter of 30 cm. Further webs 26 are lower with respect to the webs 25 by preferably one record thickness and serve for placing thereupon a record of a diameter of 25 cm., while inner webs 27 for placing thereupon records having a diameter of 17 cm. are, in turn, lowered by the thickness of one record than the webs 26.

Figure 6:
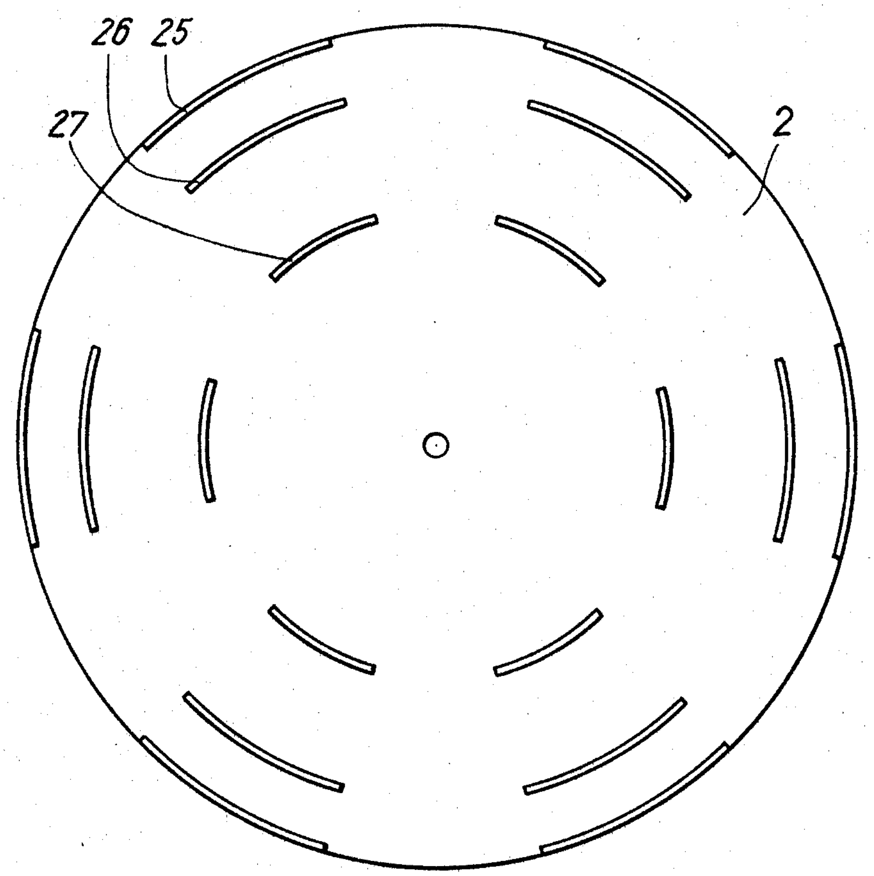
FIG. 6 shows a plan view of the turntable of FIGS. 4 and 5.

In order to facilitate the removal of records from the various elevated positions, the webs 25, 26 and 27 are suitably formed with interruptions, as is illustrated in FIG. 6.

From FIG. 5 it can be seen how a single probing pin 10′ cooperates with the deflection paths 14′, 14″ of the probing lever 13, provided at different elevations, in the manner described above. The resiliently mounted probing pin is not actuated when employing a record of a diameter of 30 cm., in the illustrated embodiment. Thereby, the control of the tone arm is influenced in such a manner that the tone arm always pivots to a position above the starting groove of a record having a diameter of 30 cm. If the probing pin is pressed downwardly by the distance *s* when placing a record of a diameter of 25 cm. on the turntable, the tone arm pivots inwardly for engaging this record. When putting on a record having a diameter of 17 cm., the pin is compressed by the distance 2*s*. In place of several probing pins there is thus provided only a single pin in the present case, which pin assumes different positions with respect to height. However, it is also possible without difficulty to assign, in corrrespondence with the embodiment of FIG. 2, a special probing pin to each record size likewise in case variously large records are held in varying elevated positions as in FIGS. 4 and 5.

Figure 7:
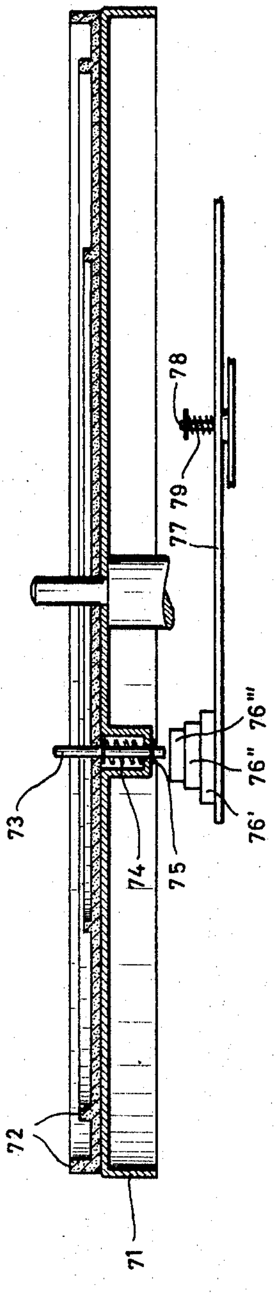
FIG. 7 shows a sectional view of a turntable having a probe element according to the invention cooperating with a control mechanism triggering the pivoting motion of the tone arm (into the playing position)
Figure 8:
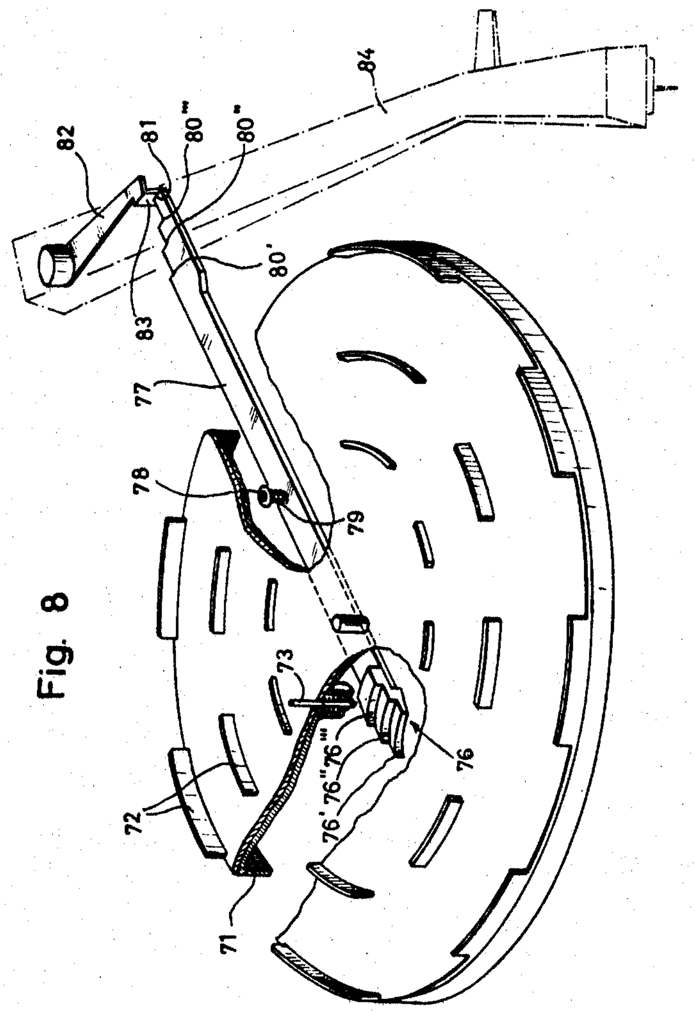
FIG. 8 shows a partially exploded view of the arrangement of FIG. 7.

As can be seen from FIGS. 7 and 8, a probing pin 73 is provided on the turntable 71 of a phonograph, this probing pin being under tension by a spring 74, the latter tending to press the probing pin 73 upwardly until a stop 75 connected with the probing pin contacts a protuberance of the turntable 71. Upon placing of a record upon the turntable, the probing pin 73 is pressed downwardly against the force of the spring 74. A covering 72 having projections is provided on the turntable, these projections having a height increasing with increasing diameter. The projections 72 cooperate with the probing pin 73 in such a manner that, depending upon the size of the record and placing of the record on a projection of a certain height correlated therewith, the probing pin is pressed downwardly to a corresponding extent. In this operation, the probing pin 73 is compressed more deeply by a record resting on the projections located on the inside than by a record having a large diameter resting on the projections located toward the outside.

The probing pin 73 compressed by a record resting on the turntable cooperates with guide tracks 76′, 76″, 76‴, of a control lever 77 which is rotatably mounted at 78 under the effect of a spring 79 under tension. Depending upon the depth to which the probing pin 73 is pressed downwardly, the probing pin cooperates with one of the guide tracks 76 positioned one on top of the other in a staggered manner, such that the control lever 77 is pivoted by a certain angular value. Abutment surfaces 80′, 80″, 80‴ provided on the side of the control lever 77 opposite the guide tracks 76 limit, in this connection, the pivoting movement of the tone arm 84 toward the inside, in dependence upon the diameter of the record.

In the operation position illustrated in the drawing, the probing pin 73 is in its uppermost rest position limited by the stop 75, since no record is in position. In this position, the probing pin is outside the path of the guide tracks 76 so that, when the turntable 71 is rotating, the pin 73 traverses the curved tracks 76 unhindered, and the lever 77 is not shifted.

In addition to the stops 80, the lever 77 is provided with a further stop 81. The tone arm 84 is coupled, in a flush manner, with a lever 82. When the lever 77 is not shifted, in case a record is not present, and the tone arm 84 is in its final position, i.e., pivoted outwardly, the stop 81 lies in the pivoting path of the abutment surface 83 at the lever 82 and thus prevents the tone arm from pivoting inwardly, so that the latter remains in its final position (terminal position). In case no record is present on the turntable 71, a lowering of the sensitive scanning system at the tone arm 84 upon the turntable 71 is thus impossible.

Although the probing lever 73 was described in the foregoing in connection with its functions as a probing device for the size of the record and as a control element for the pivoting movement of the tone arm to the starting groove, it can be understood without any difficulty that it is possible to fashion also a probing pin 73 not carrying out these functions as a blocking member exclusively which prevents the pivoting of the tone arm upon the turntable when a record is absent.

What is claimed is:

1. In mechanisms for automatic record players, the combination including a rotating turntable, probing means mounted for rotation with the turntable and variably responsive to the presence thereon of records of predetermined varying diameters, a probing lever cooperating with the probing means and angularly positioned thereby, a pivotally mounted tone arm including drive means for moving the tone arm inwardly over the turntable, and sensing means coupled with the tone arm and to the respective position of the probing lever for limiting said inward movement in accordance with a respective record diameter.

2. The invention as defined in claim 1, wherein said probing means comprise at least one pin mounted for vertical movement on said turntable, and biasing means for urging said pin upwardly, said pin being positioned for contact with the underside of a record of predetermined diameter and movable downwardly in response to the presence of said record on the turntable.

3. The invention as defined in claim 1, wherein said probing means include a plurality of movable elements, and means for moving said element into contact with a record for sensing the diameter of a record.

4. The invention as defined in claim 1, wherein a plurality of upwardly directed arcuate webs is provided on the turntable for supporting a record, said webs being arranged concentric with the axis of rotation at spaced radial distances corresponding with records of predetermined varying radii, said webs terminating in different horizontal planes in accordance with their spacing from the axis, and means for sensing the respective plane of a record supported on said webs.

5. The invention as defined in claim 2, wherein said probing lever is horizontally and pivotally mounted adjacent the turntable, said probing lever being provided with a plurality of abutments for selectively limiting inward movement of the tone arm and also being provided with deflection elements engageable with respective ones of said vertically movable pins for selective positioning of said abutments.

6. The invention as defined in claim 5, wherein said probing lever is movable to a rest position, one of said abutments being arranged when the lever is in the rest position to prevent inward movement of the tone arm beyond the outer rim of the turntable to prevent damage to the tone arm mechanism.

7. The invention as defined in claim 6, wherein when said probing lever is in said rest position all of said deflection elements are positioned away from engagement with any of said pins.

8. The invention as defined in claim 6, wherein said tone arm is provided with an abutment engageable with said one abutment on the probing lever.

References Cited

UNITED STATES PATENTS

| | | | |
|---|---|---|---|
| 3,181,872 | 5/1965 | Dvorin | 274—15 |
| 3,127,180 | 3/1964 | Lehmann | 274—15 |
| 2,896,953 | 7/1959 | Da Costa et al. | 274—15 |
| 2,868,547 | 1/1959 | Vistain | 274—15 |
| 2,616,708 | 11/1952 | Vivie | 274—15 |
| 1,436,790 | 11/1922 | Bowman | 274—39 |

LEONARD FORMAN, *Primary Examiner.*

F. J. D'AMBROSIO, *Assistant Examiner.*

U.S. Cl. X.R.

274—39